US006433288B1

(12) United States Patent
Olafsson

(10) Patent No.: US 6,433,288 B1
(45) Date of Patent: Aug. 13, 2002

(54) METHOD AND APPARATUS FOR WEIGHING

(75) Inventor: Jon Thor Olafsson, Gardabae (IS)

(73) Assignee: Marel HF, Revkjavik (IS)

( * ) Notice: Subject to any disclaimer, the term of this patent is extended or adjusted under 35 U.S.C. 154(b) by 0 days.

(21) Appl. No.: 09/600,645

(22) PCT Filed: Jan. 20, 1999

(86) PCT No.: PCT/IS99/00002
§ 371 (c)(1),
(2), (4) Date: Sep. 5, 2000

(87) PCT Pub. No.: WO99/36753
PCT Pub. Date: Jul. 22, 1999

(30) Foreign Application Priority Data

Jan. 20, 1998 (IS) .................................................. 4654

(51) Int. Cl.⁷ .............................................. G01G 19/00
(52) U.S. Cl. ...................................... 177/145; 177/199
(58) Field of Search ........................... 177/1, 119, 145, 177/199, 200

(56) References Cited

U.S. PATENT DOCUMENTS

| | | | | |
|---|---|---|---|---|
| 3,826,319 A | * | 7/1974 | Loshbough | 177/25.15 |
| 4,437,561 A | * | 3/1984 | Hasegawa et al. | 177/200 |
| 4,526,244 A | * | 7/1985 | Chauveau | 177/1 |
| 4,570,728 A | * | 2/1986 | Toyoda | 177/1 |
| 4,754,822 A | * | 7/1988 | Altenpohl et al. | 177/145 |
| 4,912,972 A | * | 4/1990 | Gregerson et al. | 177/200 |
| 5,174,400 A | * | 12/1992 | Hasegawa et al. | 177/200 |
| 5,178,227 A | * | 1/1993 | Kvisgaard et al. | 177/145 |
| 5,300,736 A | * | 4/1994 | Ehrhart | 177/145 |
| 5,585,604 A | * | 12/1996 | Holm | 177/1 |
| 5,635,679 A | * | 6/1997 | Kohashi et al. | 177/145 |
| 5,684,275 A | * | 11/1997 | Tolson | 177/119 |
| 5,990,422 A | * | 11/1999 | Komori et al. | 177/145 |

FOREIGN PATENT DOCUMENTS

| | | |
|---|---|---|
| EP | 342561 | 11/1989 |
| EP | 662605 | 7/1995 |

* cited by examiner

Primary Examiner—Randy W. Gibson
(74) Attorney, Agent, or Firm—Pillsbury Winthrop LLP

(57) ABSTRACT

A conveyor weighing unit is provided for weighing objects transported along a conveyor. The conveyor is driven in a revolving manner over a weighing device. The weighing device includes two or more weighing platforms, each platform having a pre-defined platform length. Each weighing platform continuously weighs the conveyor belt section placed thereover and the object transported thereon. One or more adjacent weighing platforms constitutes a weighing unit having a total platform length equal or greater than the object length to be weighed. The weighing platforms are operatively connected to a data processing unit, which receives and processes data from the weighing platforms, and based thereupon, determines the length and weight of the object. An accordingly appropriate number of adjacent platforms are selected, having an added length at least equal to a length of the object to be weighed to thereby enable minimal spacing between adjacent objects and maximum operational capacity.

17 Claims, 7 Drawing Sheets

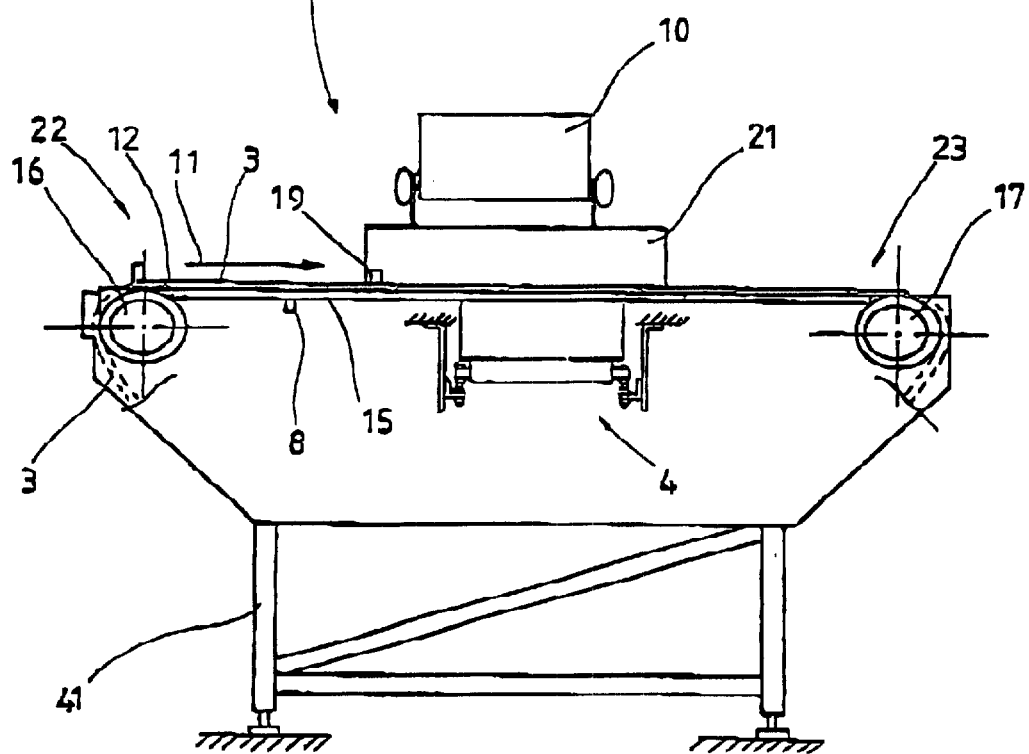
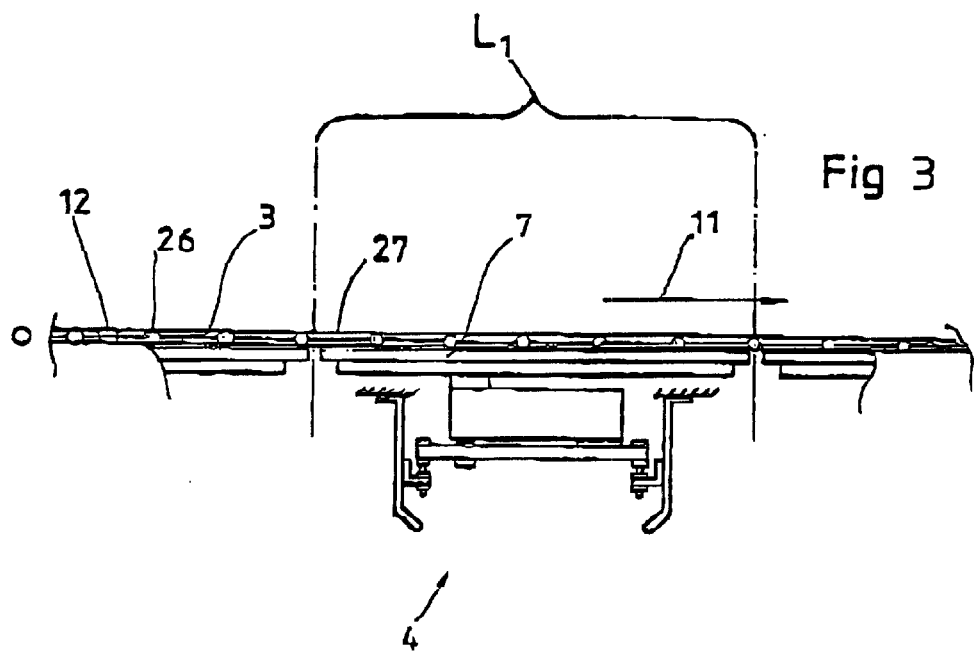

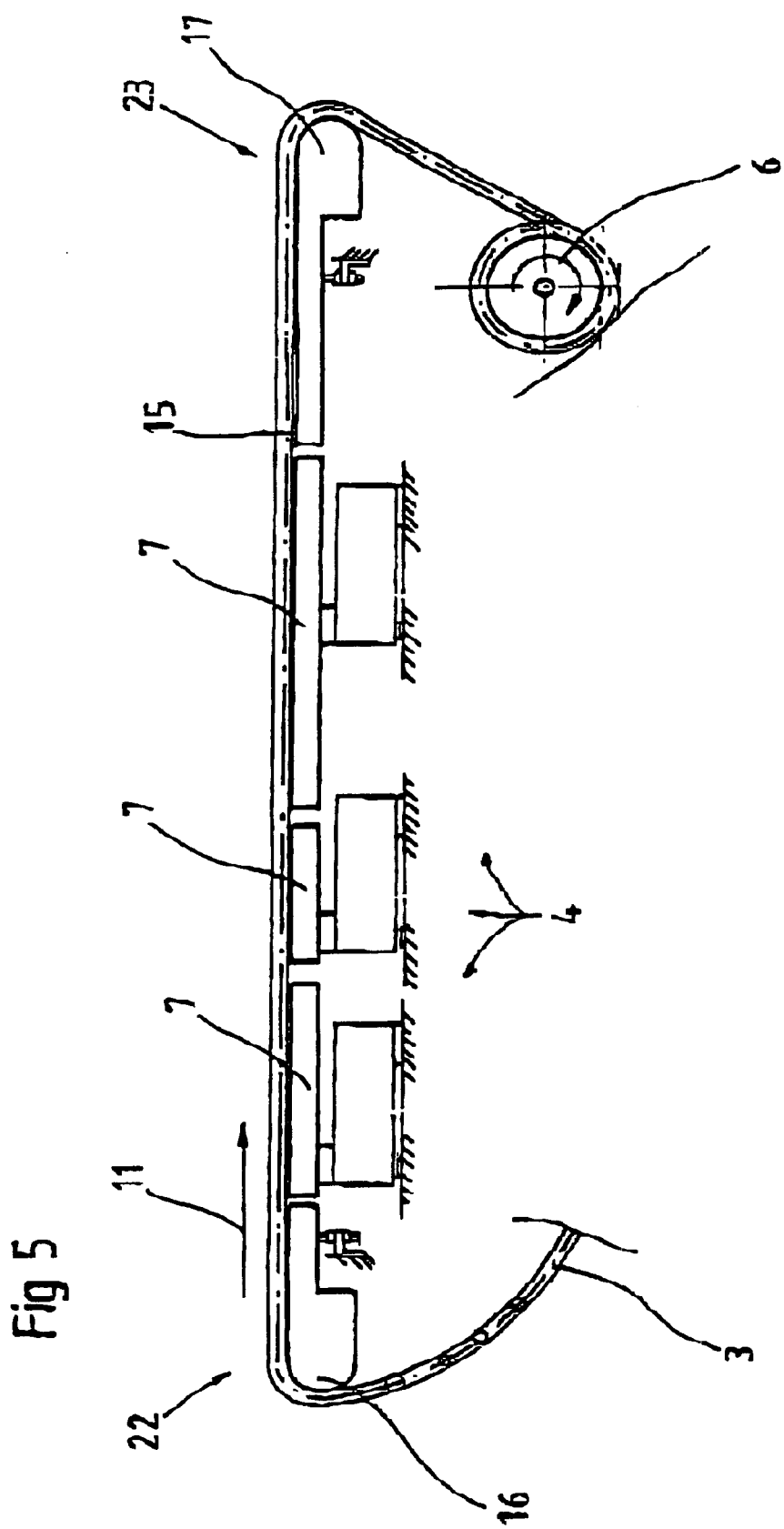

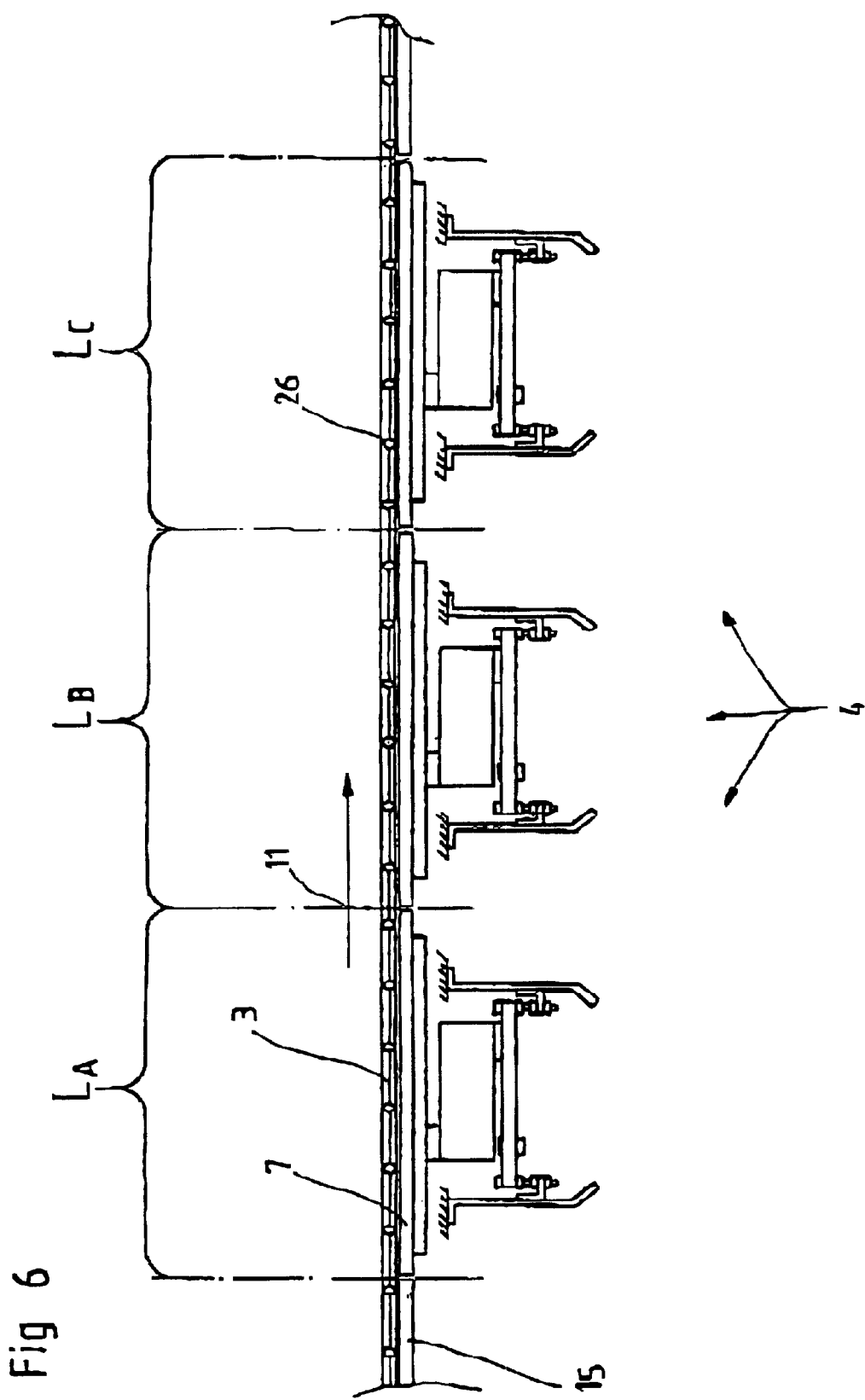

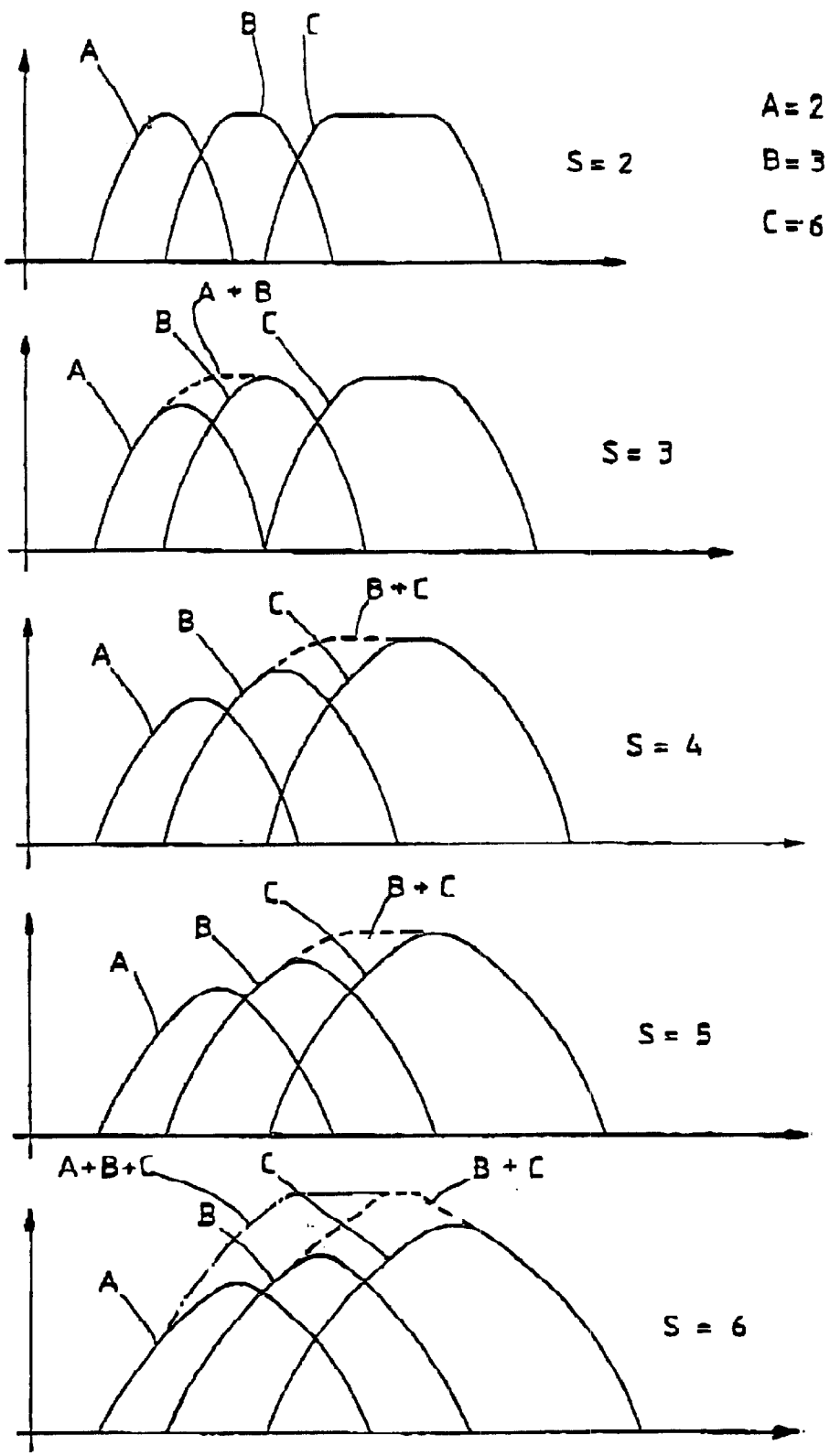

METHOD AND APPARATUS FOR WEIGHING

TECHNICAL FIELD

The invention relates to a method and apparatus for weighing by conveyor-type weighing unit, where a conveyor belt forming an endless loop is transported along a first guiding unit, defining a first conveying direction and extending in-between the top sides of opposite arranged rollers. The belt is driving in a revolving manner by a driving unit and transported over a weighing device in a downstream direction. The weighing device being a part of the first guiding unit and performs weighing of objects transported along the conveyor.

BACKGROUND OF THE INVENTION

Conveyor weighing has been known weighing technique for quite some time. Such apparatus have mainly been used for weighing of bulk material such as grain, rocks and other like materials. There is a growing need for accurate and high speed weighing units, both continuous weighing of bulk material as well as for weighing of individual objects such as food pieces. It is essential in the food processing to measure as exact as possible the weight of the object being processed prior to various type's of operations such as sorting, cutting, or packaging, The weighing of individual food pieces transported along a conveyor is today an important operation in processing of f.ex. fish filets and trimming of meat to mention two. If one had to weigh every object individually on a stationary weighing unit, the processing capacity would be diminished dramatically. There is however no question that the aforementioned applies not only to processing of fish and meat but also to other types of food and/or objects.

The main disadvantage of the existing conveyor-type weighing apparatus, especially those available for the food processing industry is lack of accuracy and low processing capacity. Further disadvantage as commonly known, is the use of one weighing platform, where the length of the platform determines the processing capacity of the weighing apparatus. If a number of single objects, are to be weighed successively and without disturbance to a next adjacent object the distance between two successive objects must be equal or greater than the length of the platform. This results in low processing capacity as the maximum length of platform needed determines the distance between adjacent objects. One can only increase the processing speed by decreasing the length of the weighing platform. By decreasing the length of a platform a larger number of objects can not be successively weighed. On the other hand by increasing the length of a platform, the distance between the objects on the conveyor must be increased and thereby the process capacity will be decreased.

From U.S. Pat. No. 4,526,244, it is known to use three or more, but spaced apart weighing stations or areas disposed along a conveying path and a comparator (computer) for comparing the weighings from each weighing station. However, the 244 Patent does not teach the use of side by side arrangement of weighing platforms.

BRIEF DESCRIPTION OF THE INVENTION

The object of the invention is to provide an accurate and high-speed conveyor-type weighing unit capable of weighing objects of varying dimension at high-speed and operating performance.

The conveyor-type weighing unit according to the invention is characterised in; the weighing device comprising;

two or more side by side, in a conveying direction arranged weighing platforms, each platform having a predefined platform length, each weighing platform continuously weighing the conveyor belt section placed thereover and the object transported thereon. One or more adjacent arranged weighing platforms may constitute at each time a weighing unit having a total platform length equal or greater than the object length to be weighed, said weighing platforms being operatively connected to a data processing unit, said data processing unit receiving and processing data from said weighing platforms, and based thereupon, the length/weight of the object is determined and an accordingly appropriate number of adjacent platforms selected, having total length at least equal or greater than the object to be weighed and thereby enabling minimal spacing between adjacent objects and maximum operational capacity.

As a result it is possible to perform weighings of objects of varying length with a minimum distance between the objects, and thereby obtain high processing speed. By this arrangement, the distance between adjacent objects only needs to be equal or larger than the length of one of the platforms or added length of two or more adjacent platforms. By this arrangement, objects of varying length can be weighed with minimum distance between them at high speed and with great accuracy.

The invention is moreover characterised in that a predetermined limit is when the first derivative of two successive measurements equals to zero.

The invention is further characterised in that the number of weighing platforms may be three or more.

Moreover according to the invention it is particularly preferred that the platforms have different length.

According to the invention, it is particularly preferred that the number of platforms may be unlimited.

Moreover, the number of platforms may be unlimited and two or more of the platforms may form a weighing unit whose added platform length is larger than the length of the object to be weighed.

Finally, according to the invention, a method is characterised in that the object is moved along the conveyor belt in a downstream direction over a weighing device comprising two or more weighing platforms. The platforms are arranged side by side in the downstream direction. Each of the platforms continuously measure the weight of the conveyor belt transported over them. The weighing measurements are continuously sent to a data processing unit, where the measurements from one or more platforms are processed and continuously compared. If a certain number of repeated measurements from the platforms forms a weighing measurements within a prescribed minimum time and/or weighing range, such measurement represent the weighing of the respective object.

Moreover according to the invention it is particularly preferred that the prescribed time- and/or weighing minimum is when the first derivative ($\Delta y/\Delta x$) of two or more repeated weighing measurements equal to zero, then such measurement constitute the weighing of the object.

And last according to the invention it is particularly preferred that the prescribed time and/or weighing minimum is when the first derivative ($\Delta y/\Delta x$) of the added weighing of two or more weighing platforms equal to zero, then such measurement constitute the weighing of the object.

BRIEF DESCRIPTION OF THE DRAWINGS

The invention is explained in greater detail below with reference to the accompanying drawings, in which:

FIG. 2b is a side view of the conveyor-type weighing unit, FIG. 3 is a sectional cut view of the conveyor belt and a weighing platform of the weighing device seen from the side, FIG. 5 is a side view of one possible design of the conveyor belt with three weighing device of different length, FIG. 6 is a side view of a possible line up of three weighing platforms, and FIG. 7 shows a weighing diagram for the weighing of individual objects using three platforms,

Figure 1A:
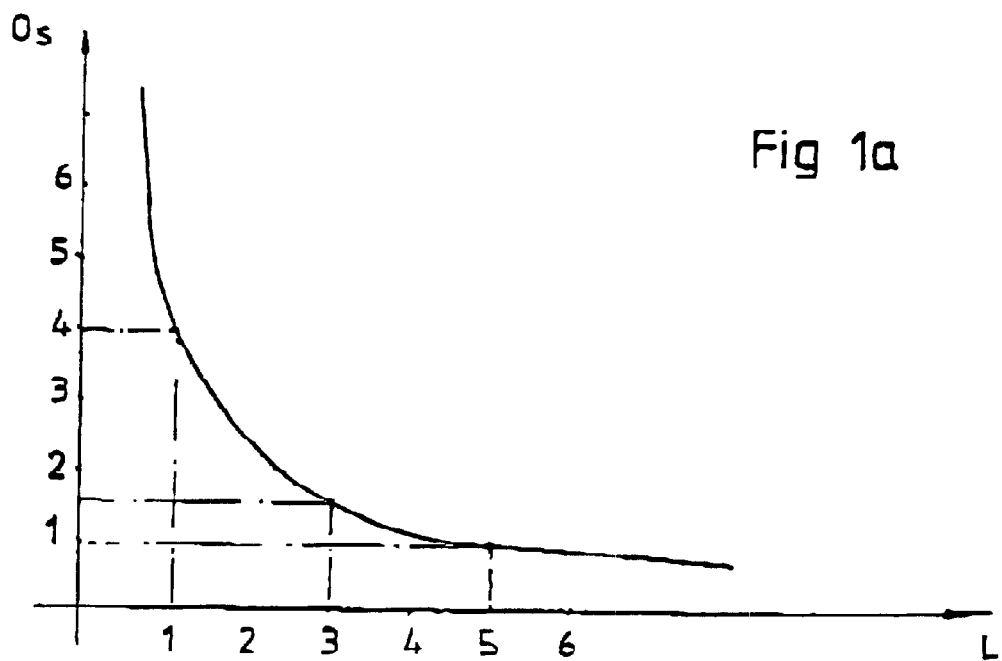
FIG. 1a shows a diagram for the weighing capacity of a conveyor weighing unit with one platform of varying length.

DETAILED DESCRIPTION OF THE PRESENTLY PREFERRED EXEMPLARY EMBODIMENTS OF THE INVENTION

The apparatus illustrated in the FIGS. 2–6 comprises a conveyor-type weighing unit (2) arranged on a stationary supporting frame structure (41). A conveyor belt (3) being a part of the conveyor-type weighing unit forms an endless loop driven in a revolving manner by a driving unit (6). The conveyor belt is transported along a first guiding unit (15), arranged horizontally in a downstream direction between top sides of reversing rollers (16, 17). A weighing device (4) is incorporated as a part of the first guiding unit and thereby forms a part of a platform the conveyor belt is transported along. As the belt is transported along the first guiding unit (15), continuous weighing measurements are made by the weighing device (4). The section of the belt ($L_1$) placed over the weighing platform (7) is weighed at each time. A computer data processing unit (10) is connected to respective parts of the equipment for monitoring and controlling the operation.

FIG. 1a, shows a diagram for the weighing capacity of a conveyor weighing unit with one platform of varying length. The number of weighings per minute ($O_s$) are shown on the y-axis and the length of the platform on the x-axis. If the conveyor belt speed ($V_c$) is constant, the number of weighings per minute can be found by the formula $O_s = V_c/L$, where the L is the length of the platform. If the conveyor belt speed $V_c$ is increased, the curve is shifted up, but if the conveyor belt speed $V_c$ is decreased, the curve is shifted down.

To be able to conduct accurate weighing by a conveyor-type weighing unit, the length of the weighing platform must be greater or equal to the length of the object to be weighed. This is due to the fact that when the object is transported along the conveyor, it is only when the whole object is placed on the weighing platform that a total weight can be measured. If the object is longer than the platform, and rests on some other parts of the conveyor, it is never possible to place the whole object on the platform and conduct weighing of the whole object. This results also in that the distance between two adjacent objects must be equal or greater than the length of the platform. The diagram shows how the number of weighings per minute ($O_s$) will be decreased if the length of the platform is increased. On the other hand, one can see how the number of weighings can only be increased by decreasing the length of the platform. This, however, will result in that the weighing device will only be able to weigh shorter objects. As the platform becomes shorter, a greater number of objects will not be weighed.

Figure 1B:
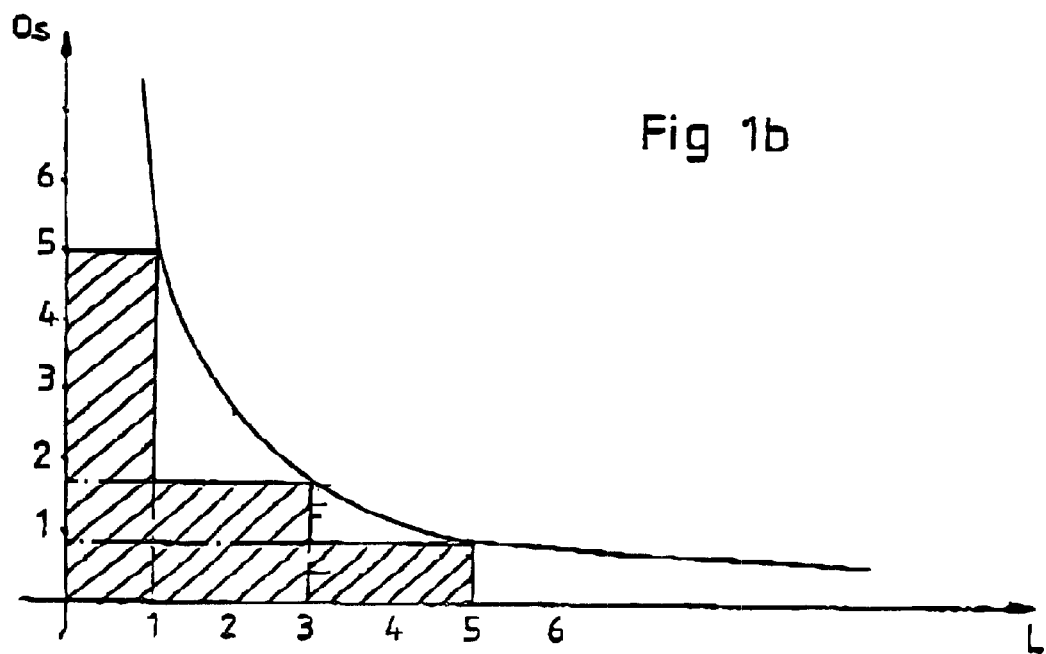
FIG. 1b shows a diagram for the weighing capacity of a conveyor weighing unit with three platforms of different length.

FIG. 1b shows the weighing capacity of a conveyor-weighing-unit with three platforms each of different length. The number of weighings per minute ($O_s$) is shown on the y-axis and the lengths of the platforms on the x-axis. By using three platforms of varying length 1, 3 and 5, the operational capacity is increased dramatically. The distance between adjacent objects is no longer equal to the length of the platform long enough to weigh the longest object, but is equal to the length of the platform the next adjacent object will be weighed on. If an object is weighed successfully on the first platform, then the distance between two adjacent objects on the conveyor is determined by the length of the first platform. If the object is successfully weighed on the second platform, then the distance between that object and the next adjacent is determined by the length of the second platform, and so on.

Based on the above one can see, that by using unlimited number of platforms the operational performance will be variable according to the length of the objects.

As often is the case in e.g., fish processing, a number of species of fish of different lengths are processed at each time. This results in the length of adjacent objects being different from one time to another. By using the multiple weighing platform principle, it is possible to perform weighing of fish or other objects of varying length, and even different length variation with the same apparatus without any adjustment or amendments of the equipment and with optimal processing performance.

Figure 2A:
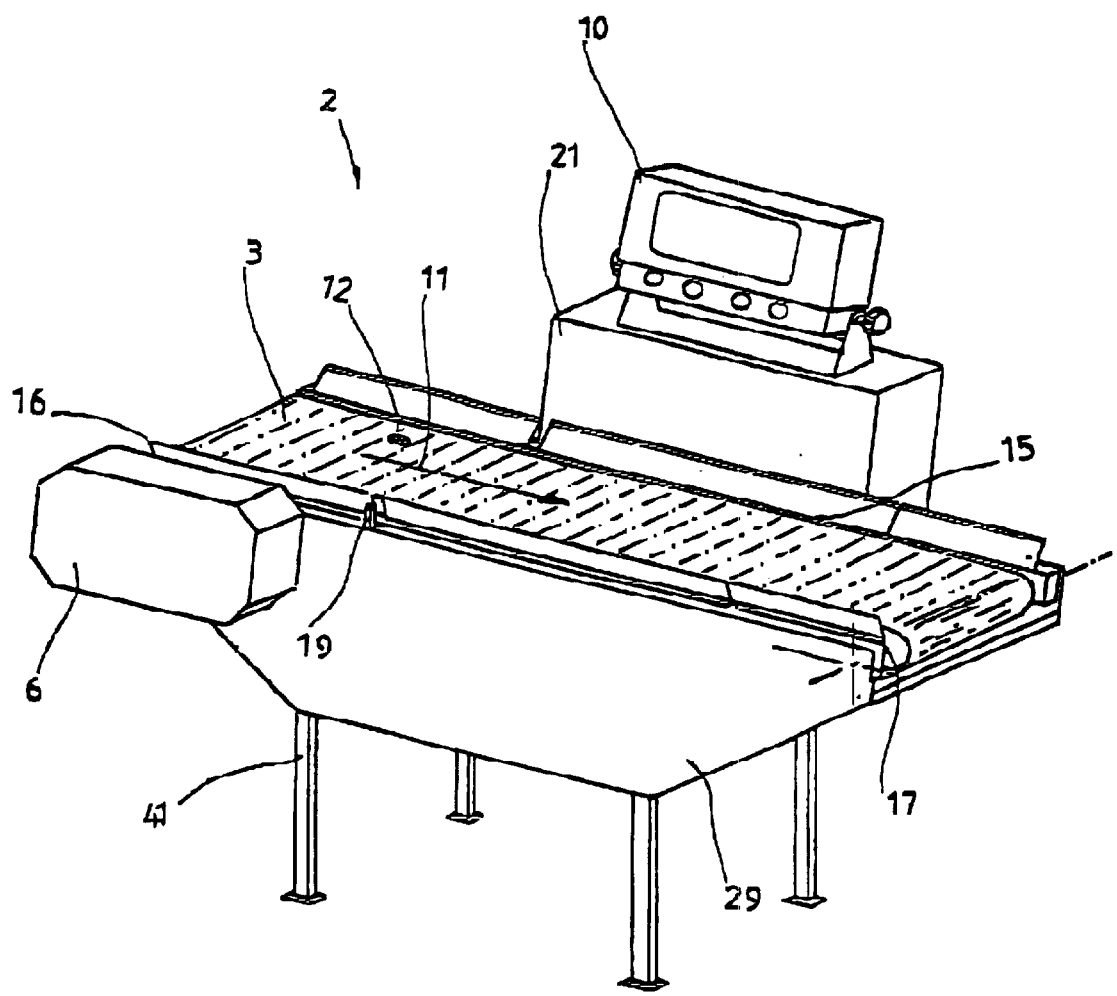
FIG. 2a shows a perspective view of the conveyor-type weighing unit according to the invention.

FIG. 2a shows a perspective view of the conveyor-type weighing-unit according to the invention. FIG. 2b shows a side view of the same as FIG. 2a but where a side protecting plate (29) has been removed. A conveyor-type weighing unit (2) supported by a frame (41) is illustrated. The weighing unit (2) comprises a conveyor belt (3) forming an endless loop which is driven in a revolving manner by a driving unit (6) in a direction downstream (11) from an in-feed end (22) to an out-feed end (23). The driving unit (6) can be equipped with a cogged driving wheel for interception with the belt and can be located anywhere along the conveyor path of the belt and either push or pull the belt over the horizontal first guiding unit. The belt (3) rests on a guiding unit (15) from a first (16) to a second reversing roller (17). The rollers can be with or without sprockets for interception with conveyor belt or, for example, non-rotating round end-units which the belt slide over (as shown in FIG. 5). A weighing device (4) forms a part of the guiding unit. A computer data processing unit (10) is connected to the weighing device (4) and other measuring unit of the apparatus. An object detector (19) is placed along the conveyor belt to detect objects to be weighed and transported along the belt. Further, a belt placement detector (8) is arranged, for example, underneath the belt path to locate a starting point (12) of the belt as the belt is transported along the first guiding unit. By having a certain detectable starting point of the conveyor belt, the data processing unit is able to locate what part of the belt is placed on the weighing device. The electrical cabinet of the apparatus is indicated by a square box (21) underneath the computer data processor (10).

FIG. 3 shows a sectional view of the conveyor belt (3) and a weighing device (4) including a weighing platform (7). The conveyor belt (3) is moved in the downstream direction (11) over the weighing platform (7). As the belt moves along and over the weighing platform continuous weighing of the section ($L_1$) of the belt placed over the platform is conducted, with or without objects to be weighed on it. The most preferable belt as shown on the figure is so called link-type belt. An unlimited number of links (27) are connected together by nit-type joint (26). Each link is turnable around the joints. However almost any other type of belt can be used without foreseeable problems.

Figure 4:
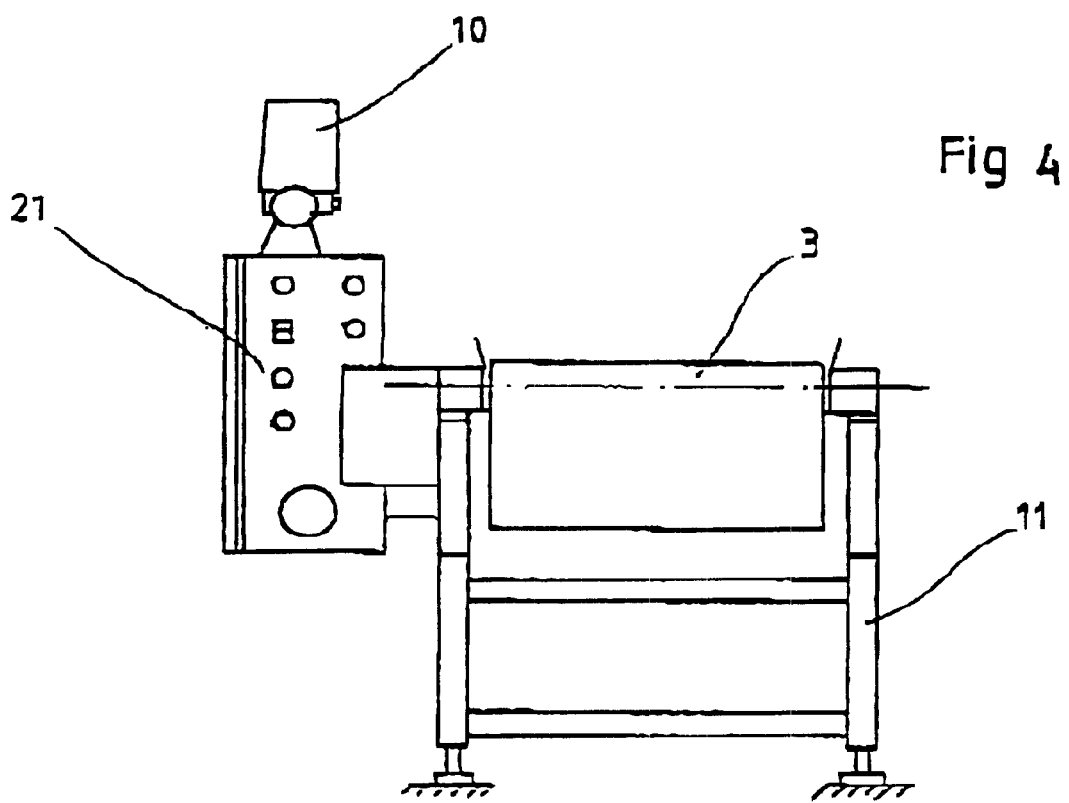
FIG. 4 is a front view of the conveyor-type weighing unit seen from the in-feed end.

FIG. 4 shows a front end view of the conveyor-type weighing unit seen from the infeed end (22). The placement of the conveyor belt (3), the supporting frame (41), the computer data processing unit (10) and the electrical cabinet (21) of the apparatus are as illustrated.

FIG. 5 is a sectional side view of one possible design of the conveyor belt guiding unit (15) with three weighing platforms (7). The platforms are arranged one after the other in the conveying direction (11). The conveyor belt (3) runs over a first roller (16) defining the input end (22) of the first conveying direction (11). The belt runs further over the weighing platforms (7) being a part of the guiding unit (15) and then over the second roller (17) defining the output end (23) of the first horizontal conveying direction. The roller (16, 17) does not necessarily need to be rotatable, but can be curved or semi-circular on the end so the belt slides easily over them. The conveyor belt (3) is driven by e.g., a toothed driving wheel (6) situated underneath the output end (23). The driving wheel pulls the conveyor belt (3) along the guiding unit (15) over the two rollers.

FIG. 6 is a side view of a possible line up of three weighing platforms. The conveyor belt (3) is pushed or pulled over the guiding unit (15) in the first conveying direction (11) and over the weighing device (4), including The three weighing platforms (7) all being a part of the guiding unit for the conveyor belt The sections ($L_A$, $L_B$ and $L_C$) of the belt placed over the platforms are weighed.

FIG. 7 show a number of weighing diagrams for the weighing of individual objects transported along the conveyor belt and over the weighing platforms. The first of the diagrams shows three curves each representing the weighing of the platforms (A), (B) and (C). The length of the platforms is defined as A=2, B=3 and C=6. The length of the objects to be weighed is varied from S=2 in the first diagram and then increased by one until for the last diagram S=6.

By using three platforms of varying length and use them as single weighing platforms as well as in added combination, it is possible to obtain so many as six different platform length.

A=2,
B=3,
A+B=5,
C=6,
B+C=9 and
A+B+C=11

As for the first one the length of the objects is 2 which is equal to the length of the first platform. The weighing on the first platform (A) shows a curve where the gradient of the curve is either larger or smaller than zero. In the maximum point, the gradient is equal to zero for one measurement. The weighing of the second platform (B) shows a curve where the gradient is equal to zero for a number of measurements, or for the time it takes the conveyor belt to move the object one unit length e.g. the platform length minus the object length The weighing of the last platform (C) show a curve where the gradient of the curve is equal to zero for a larger number of measurements, and longer than for platform (B). The interval where the gradient is zero equals the time it takes the conveyor belt to travel with the whole object placed on the platform.

As a result it is possible to determine the placement of the objects on the platform based on the gradient of the curve for the weighing measurements. If the gradient (first: derivative) (dy/dx) of the curve is zero for two or more successive weighings that is an indication that the maximum weight of the objects is reached and all the whole object is placed on the platform. The following diagram shows the curves for the repeated measurements but the length of the objects is increased by one in each diagram.

On the second diagram, both the curve for platform (A) and (B) show only one measurement where the gradient of the curve is zero. The curve does not get flat in the top section and therefore no valid measurements can be conducted. On platform (B), the curve shows one point where the gradient (dy/dx) is zero. The third platform (C) shows a curve where the gradient is zero for a repeated number of measurements. The platform length is 5, but the object length (L) is still shorter than that or 3. However, a new curve is shown. This is the combined, or added weighing of platform (A) and (B). The curve is plotted by dotted line and marked (A+B). By adding the weighing of the two platforms, it is possible to conduct measurements on a platform longer than the object and therefore obtain the gradient (dy/dx) of zero for a number of repeated measurements. This is then repeated as the length of the object is increased and as shown on the last diagram when the length of the objects is greater than the length of each of the individual platforms. By adding either platforms (B+C) or even (A+B+C), it is possible to obtain repeated measurements where the gradient (first derivative) of the curve (dy/dx) is zero.

The diagrams therefore show that as long as the objects are shorter than a length of one, two or even the added length of all three of the platforms, accurate weighing measurements can be obtained.

The diagrams represent the weighing of a single object. The situation becomes more complex when a row of objects are transported over the weighing platforms. Then, all of the platforms may show weighings at the same time. Further, two or more objects can be placed on one and the same platform at the same time. To solve the problems arising, an object detector or sensor is placed in front of the first platform. The sensor will transmit information that a new object is arriving to the data processing unit. By knowing the placement and time of arrival of the object onto the platform, the data processing unit can organize and sort out the measurements from the platforms.

The invention has been described with reference to a preferred embodiment. Many modifications can be carried out without thereby deviating from the scope of the invention. The length of the weighing platforms, as well as the number of platforms, can be varied in many ways without thereby deviating from the invention described herein. A number of measuring methods can also be used to detect the object on the conveyor, as well as detecting the starting point of the conveyor belt. By using a tachometer on the driving unit, in lieu of the belt detecting sensor, one will obtain the same results.

What is claimed is:

1. Conveyor weighing unit for weighing objects transported along a conveyor, comprising:
   a frame,
   a conveyor belt forming an endless loop,
   a first guiding unit defining a first conveying direction extending in-between the top sides of two opposite arranged rollers, a weighing device being a part of the first guiding unit, said belt being driven in a revolving manner by a driving unit and transported over said weighing device in said conveying direction, said weighing device including:

two or more side by side, in said conveying direction arranged weighing platforms, each platform having a pre-defined platform length, each weighing platform continuously weighing the conveyor belt section placed thereover and the object transported thereon, wherein one or more adjacent arranged weighing platforms constitutes at each time a weighing unit having a total platform length equal or greater than the object length to be weighed, said weighing platforms being operatively connected to a data processing unit, said data processing unit receiving and processing data from said weighing platforms, and based thereupon, the weight of the object is determined and an accordingly appropriate number of adjacent platforms selected, having an added length at least equal to the length of the object to be weighed and thereby enabling minimal spacing between adjacent objects and maximum operational capacity.

2. Conveyor weighing unit, according to claim 1, wherein the number of weighing platforms is three or more.

3. Conveyor weighing unit, according to claim 1, wherein the platforms have different lengths.

4. Conveyor weighing unit, according to claim 1, wherein the number of platforms is unlimited.

5. Conveyor weighing unit, according to claim 1, wherein the number of platforms is unlimited and two or more of said platforms form a weighing unit with a platform length that is larger than the object to be weighed.

6. Conveyor weighing unit, according to claim 1, wherein the number of weighing platforms performing each weighing is variable as well as the individual platform length depending on the length of the object to be weighed.

7. Conveyor weighing unit, according to claim 1, wherein the weighing unit comprises an object detecting sensor connected to the data processing unit for collecting information of the placement of objects arriving on the conveyor belt.

8. Conveyor weighing unit, according to claim 1, the weighing unit includes a conveyor belt detecting sensor connected to the data processing unit for collecting information of the placement of the conveyor belt transporting the objects arriving.

9. Method of weighing spaced objects in a series by a conveyor weighing unit, said method comprising:

providing a conveyor belt forming an endless loop, transporting said conveyor belt along a first guiding unit, defining a first horizontal conveying direction extending in-between the top sides of opposite arranged rollers, the first guiding unit including a weighing device being a part of the first guiding unit, driving said belt in a revolving manner by a driving unit over said weighing device in said conveying direction, conveying the object along the conveyor belt in said conveying direction over the weighing device, said weighing device comprising two or more side by side, in said conveying direction arranged weighing platforms, continuously weighing the conveyor belt section placed over two or more side by side in said conveying direction arranged weighing platforms of said weighing device and the object being transported thereon, forming a weigh in unit with one or more adjacent arranged weighing platforms having a total platform length at least equal to the object length to be weighed, processing data from said weighing platforms, and based thereupon, determining the weight of the object and accordingly selecting an appropriate number of adjacent platforms having an added length at least equal to a length of the object to be weighed, thereby enabling minimal spacing between adjacent objects and maximum operational capacity.

10. Method according to claim 9, wherein the prescribed time and weighing range is when the first derivative (dy/dx) of two or more repeated weighing measurements is equal to zero.

11. Method according to claim 9, wherein if the first derivative (dy/dx) of the added weighing of two or more weighing platforms is equal to zero, such measurement constitute the weighing of the object.

12. Conveyor weighing unit according to claim 1, wherein, based on the processed data, the length of the object is determined.

13. Method according to claim 9, wherein based on the processed data, the length of the object is determined.

14. Method according to claim 9, wherein one of the prescribed time and weighing range is when the first derivative (dy/dx) of two or more repeated weighing measurements is equal to zero.

15. A method of weighing objects in a spaced series of objects comprising:

conveying an object of said spaced series of objects along a conveyor in a conveying direction, providing along at least a portion of said conveyor in the conveying direction a consecutively aligned series of weighing platforms, taking a series of weight measurements for each object by each weighing platform of said series of weighing platforms, transmitting data from each weighing platform to a data processing unit, receiving and processing data from said weighing platforms, determining a total weight of said object, based on measuring two or more consecutively equal weights of said object by at least one weighing platform, and adjusting a distance between said object and a successively conveyed object of said series of objects to at least equal a total length of said at least one platform.

16. A method according to claim 15, wherein said total weight of said object is indicated when the first derivative of at least two successive weighing measurements is zero.

17. A method according to claim 15, further comprising assigning said at least one weighing platform to measure weights of successively conveyed objects.

* * * * *